March 4, 1952 H. L. BALDWIN 2,587,681
LOG HANDLING APPARATUS
Filed April 6, 1946 3 Sheets-Sheet 1

INVENTOR.
Harold L. Baldwin
BY

March 4, 1952 H. L. BALDWIN 2,587,681
LOG HANDLING APPARATUS
Filed April 6, 1946 3 Sheets-Sheet 3
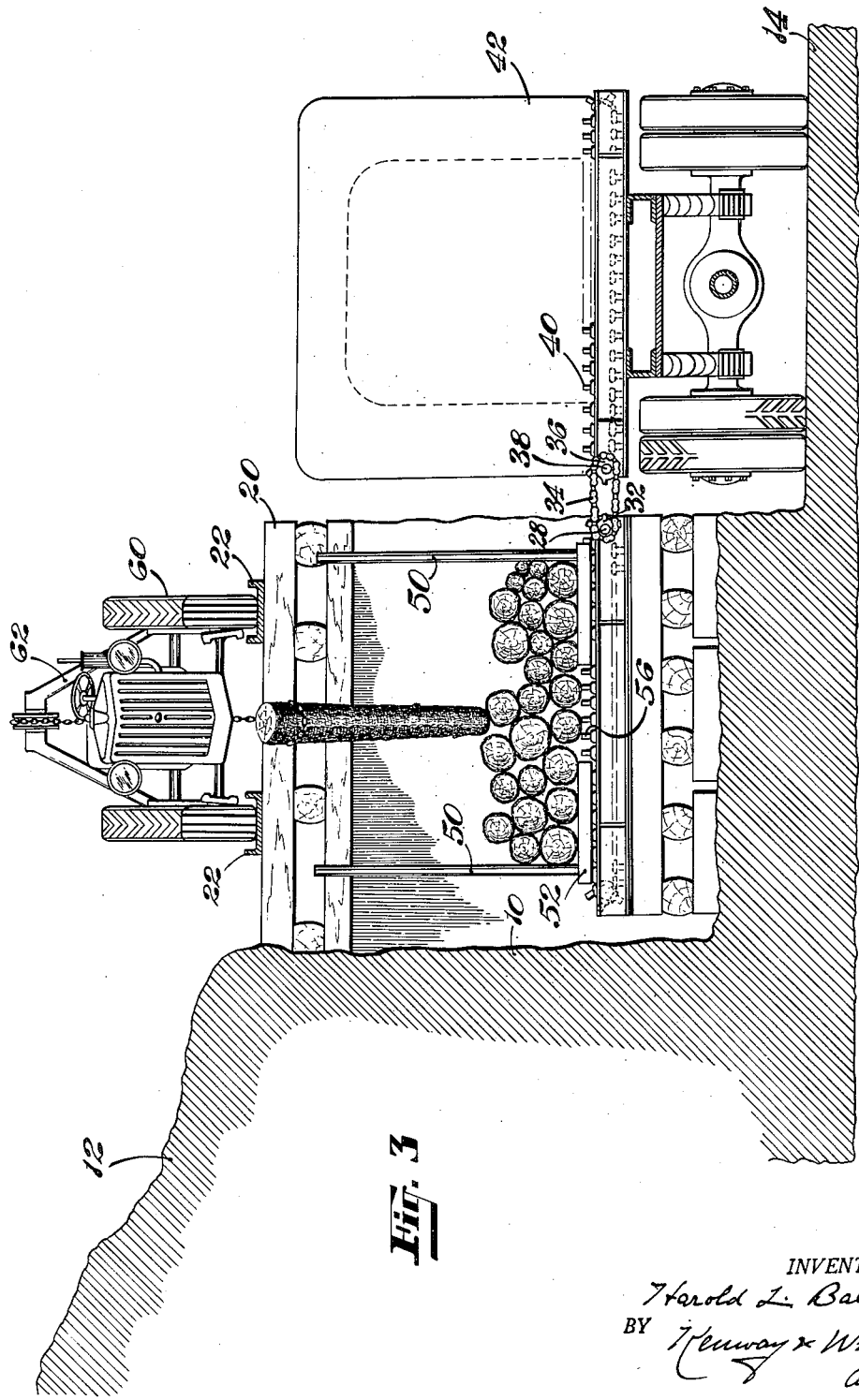
INVENTOR.
Harold L. Baldwin.
BY Kenway & Witter
Attys.

UNITED STATES PATENT OFFICE 2,587,681

LOG HANDLING APPARATUS

Harold L. Baldwin, St. Johnsbury, Vt.

Application April 6, 1946, Serial No. 660,128

3 Claims. (Cl. 214—41)

This invention relates to equipment for handling logs which are to be conveyed from the forest to a saw mill.

For untold generations it has been the custom to fell a tree in the forest, cut the tree into convenient log lengths, and drag each log separately to some means of transportation, a nearby stream, a flat car, or truck. The logs then undergo a journey ending at a saw mill or pulp mill where they are operated upon in accordance with the nature of their ultimate use. Logging operations have always heretofore involved a relatively large amount of heavy and dangerous physical labor. Customarily each log of any size has been handled individually during many steps of the logging process, whether by hand or by mechanical agency.

The present invention comprises, in one aspect, an improvement on the log handling system disclosed in my copending application Serial No. 608,023, filed July 31, 1945, now Patent No. 2,467,354, dated April 12, 1949. The equipment disclosed in said application is very well adapted for the handling and transportation of relatively short logs, such for example as logs of the type commonly used for pulp.

The most important object of the present invention is to reduce the labor and expense presently required in logging operations and to provide equipment by means of which logs of any length may be collected and conveniently formed into loads in the forest and thereafter moved and transported as unit loads rather than as individual logs.

Broadly speaking the equipment of my invention comprises a conveyor having log guiding and load forming means mounted on it, the conveyor being disposed beneath a pair of spaced overhead tracks and so disposed as to be in substantial alignment with a similar conveyor carried by a truck. The spaced tracks bridge a pit disposed between a pair of ramps and in this pit the log-receiving conveyor is located. Consequently a tractor may drag a log or logs up one ramp and proceed across the spaced tracks. When released from the tractor at the proper time, the log drops through the space between the tracks and upon the conveyor. When sufficient logs have thus been deposited upon the log-receiving conveyor to make up a suitable load, a conveyor equipped truck is driven alongside the conveyor in the pit, and the entire load is moved bodily and at a single operation from the pit to the truck. Thereafter the logs are moved as a unit as fully described in my copending application.

The several features and advantages of the invention will be more readily understood and appreciated from the following detailed description of a preferred embodiment thereof selected for purposes of illustration and shown in the accompanying drawings, in which:

Fig. 3 is a view in cross section along the line 3—3 of Fig. 1.

Figure 1:
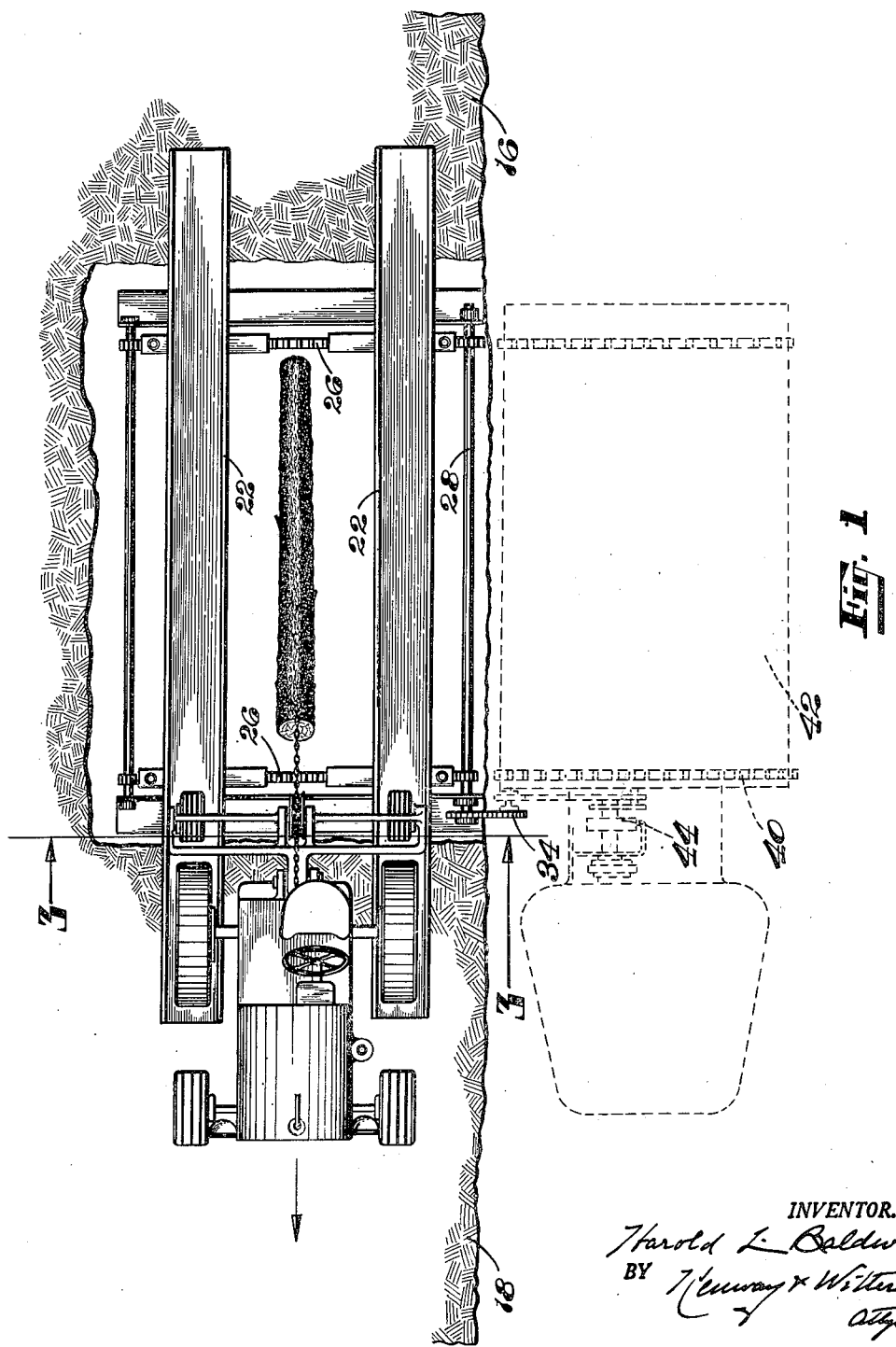
Fig. 1 is a plan view of a system constructed in accordance with my invention.

The tractor shown in Fig. 3 has been displaced rearwardly from its position in Fig. 1 in order that its relation to the pit may be more easily appreciated.

The system of my invention can most easily be constructed by excavating a three-sided pit in the side of a hill, as shown most clearly in Fig. 3 in which it will appear that a pit 10 has been excavated from the side of a hill 12. A truck driveway 14 is cut out on a lower level than the pit and runs parallel thereto, and the hill at the side of the pit is dressed or graded to form a pair of ramps 16 and 18. The upper walls of the pit 10 are strengthened and buttressed by conventionally arranged cross beams 20 upon which rest the ends of a pair of spaced tracks 22. The tracks 22 may be constructed of wood, but are preferably steel channel irons which offer flanges tending to confine the wheels of a vehicle to the tracks.

In the bottom of the pit 10 I provide a solid support or foundation formed of heavy logs or ties 24 upon which I mount the log-receiving conveyor which, as herein shown, may comprise a pair of chains 26 driven by sprockets (not shown) keyed to a shaft 28 journalled adjacent both ends in a pair of angle irons 30 mounted on the support 24. One end of the shaft 28 carries another sprocket 32 receiving a short driving chain 34 which is driven by a sprocket 36 carried on a shaft 38 similar to the shaft 28 and forming part of a similar conveyor 40 mounted on the bed of a truck 42 and driven by the truck engine through appropriate power take-off means shown diagrammatically at 44 in Fig. 1. Upon the conveyor chains 26 are disposed four stakes or guides 50 each of which is secured at its lower end to an inwardly directed channel shaped foot 52. The channel of each foot 52 is shaped to receive and rest upon lugs 56 which are formed on alternate links of the conveyor chains 26. The lugs collectively present a supporting surface of substantial area for the feet and thus serve to maintain the stakes 50 in upright position.

The stakes 50 with their associated feet 52 serve as log-receiving and confining means whereby a desired number of logs may be stacked on the conveyor to form a unit load. When the conveyor in the pit is coupled to the conveyor on a truck, a load may be bodily transferred from the pit conveyor to the truck. Then the chain 34 may be disconnected from the conveyors and the truck used to transport the load to any desired location such as a saw mill, flat car, or pulp mill. I contemplate the provision at the destination point of similar conveyors (not shown) by means of which the logs may be unloaded from the truck, still as a unit, and thereafter handled by conventional means.

Figure 2:
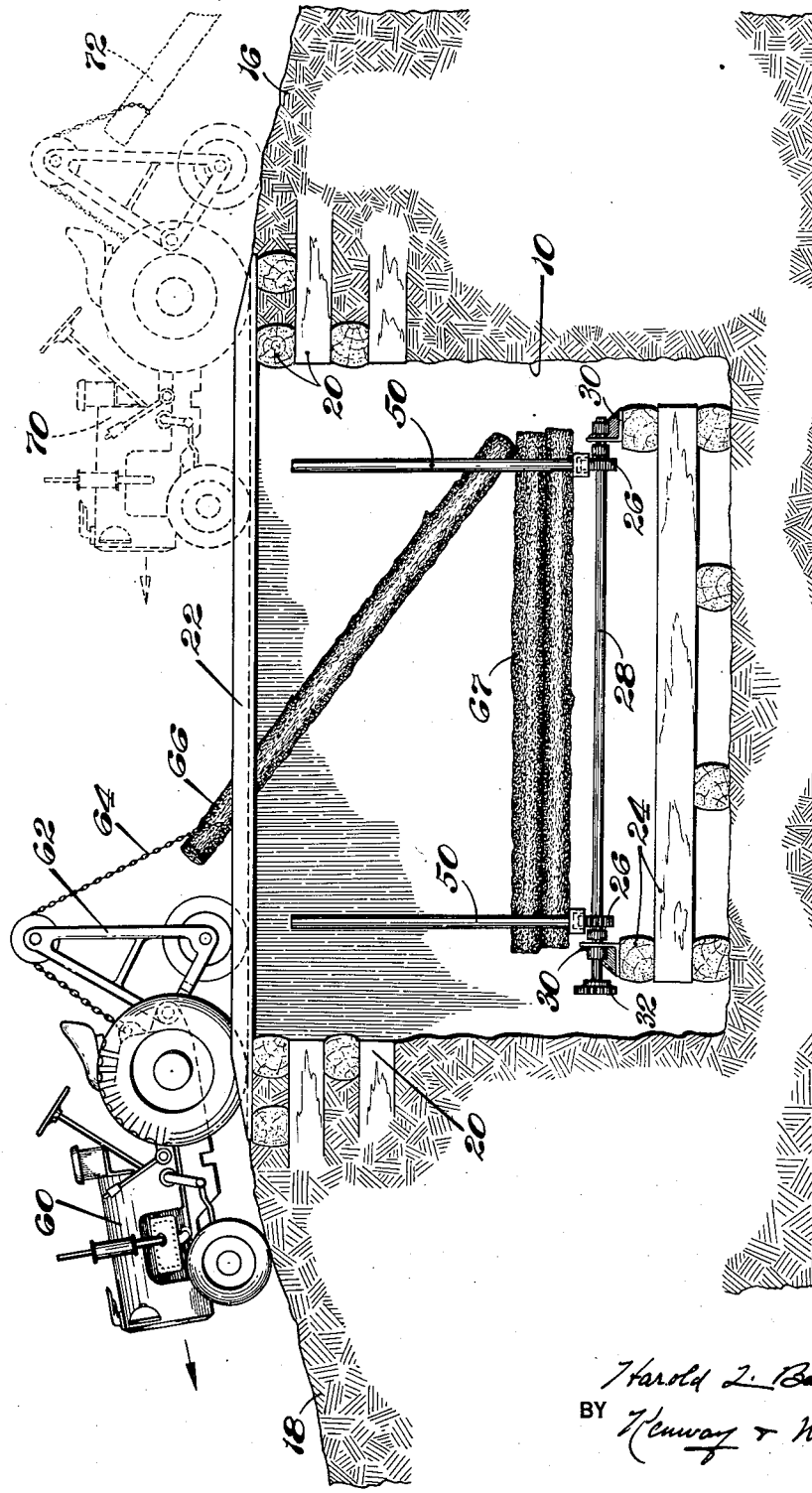
Fig. 2 is a view in side elevation of the installation.

In Fig. 2 there is clearly shown the operation of the entire system as installed for the handling of large logs. A tractor 60 is coupled to a logging arch 62 over which runs a chain 64 hitched to the end of the log 66. The tractor has picked up the log 66 where it was felled in the forest, elevated one end of it by means of the logging arch 62 and the chain 64, and has towed the log up the ramp 16 and across the tracks 22. When the lower end of the log cleared the end of the ramp 16, it dropped between stakes 50 and upon the conveyor 26. The tractor operator then slacks off on the chain 64 and lowers the remainder of the log into position on the conveyor. Subsequently the chain 64 is removed from the end of the log 66 and the tractor 60 is free to go back for another log, leaving the scene by proceeding down the ramp 18. A second tractor 70, shown in dotted lines, is shown approaching the pit 10, drawing behind it a log 72. The rapidity with which a pile is formed depends upon the number of tractors operating the system and the distance between the pit and the place where the trees are being felled. As shown in Fig. 2 a pile of logs 67 is already partially formed.

In addition to confining the logs to a predetermined load formation the stakes 50 serve to guide the logs as they drop from the tracks to the conveyor and thus tend to form the logs in a neat pile.

The system illustrated in the drawings is capable of considerable modification without a departure from the spirit of the invention. For example the tracks 22 could be supported by any suitable means above the pit to form a continuous ramp so that logs could be drawn up the hill above the pit 10 and then rolled over the crest of the pit and permitted to fall upon the conveyor. In the system illustrated it is only the trailing end of the log that touches the ground.

I have found that the amount of labor involved in operating a system constructed in accordance with my invention is so much less than is required in customary logging operations that I have been enabled to operate on a commercially practical scale at half the cost of logging operations carried on in accordance with traditional methods. That is to say, I have cut in half the cost of felling trees and delivering logs to a mill.

In this application I have not dwelled upon details of the construction of the conveyors, because I have been able to use conveyors of commercial type built according to the disclosure of my copending application.

Having thus disclosed and illustrated an embodiment of my invention, what I claim as new and desire to secure by Letters Patent of the United States is:

1. Apparatus of the class described, comprising an open sided pit, parallel flanged tracks bridging the pit, a first conveyor mounted at the bottom of the pit and movable in a direction at right angles to said tracks, a plurality of upright members supported for movement with and upon said conveyor, said members serving first to guide and stack logs dropped from the driveway upon the conveyor and then to confine them thereupon, a second conveyor mounted adjacent and in alignment with the first conveyor, and means for driving said conveyors to shift said members and a pile of logs confined thereby from said first conveyor bodily upon the second conveyor without disturbing the form of the pile.

2. Log handling apparatus comprising an open sided pit, spaced channel irons providing a track bridging the pit, a first conveyor mounted at the bottom of the pit and movable transversely with respect to said track, a second conveyor mounted adjacent to and in alignment with the first conveyor, upright stakes carried by the first conveyor and adapted to receive long logs drawn inwardly between the channel irons of said track to confine the said logs in a pile below the track upon the first conveyor and to carry the logs as a unit load in movement along the said conveyors, and means linked to both conveyors adapted to drive both conveyors in unison, whereby the unit load of logs is transferred out from beneath the tracks from the first conveyor to the second conveyor without disturbing the form of the unit load.

3. Log handling apparatus comprising an open sided pit, spaced channel tracks bridging the pit, a conveyor mounted in the pit below the track and movable transversely with respect to said tracks, log receiving means carried by the said conveyor and adapted to receive logs drawn inwardly between said tracks and to retain the logs as a unit load, a truck-born conveyor positioned adjacent to and in alignment with the conveyor in the pit, and means adapted to interconnect and drive both conveyors in unison whereby the log receiving means is transferred from the conveyor in the pit to the truck-born conveyor without disturbing the form of the unit load.

HAROLD L. BALDWIN.

REFERENCES CITED

The following references are of record in the file of this patent:

UNITED STATES PATENTS

| Number | Name | Date |
|---|---|---|
| 510,206 | Bode | Dec. 5, 1893 |
| 1,386,053 | Dyer | Aug. 2, 1921 |
| 1,746,127 | Overholt | Feb. 4, 1930 |
| 1,756,278 | Buckner | Apr. 29, 1930 |
| 2,287,068 | Shonnard | June 23, 1942 |
| 2,413,979 | Lamb | Jan. 7, 1947 |
| 2,467,354 | Baldwin | Apr. 12, 1949 |

FOREIGN PATENTS

| Number | Country | Date |
|---|---|---|
| 25,154 of 1935 | Australia | Sept. 15, 1936 |